April 6, 1965   L. W. WIGHTMAN   3,176,380
METHOD OF ASSEMBLING A DYNAMOELECTRIC MACHINE
Original Filed Aug. 26, 1958   2 Sheets-Sheet 1
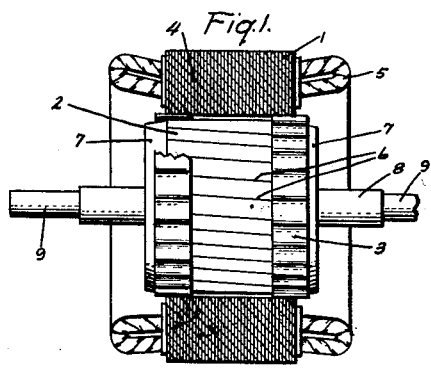
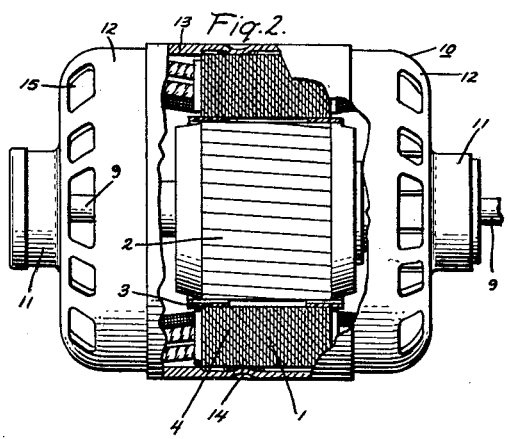
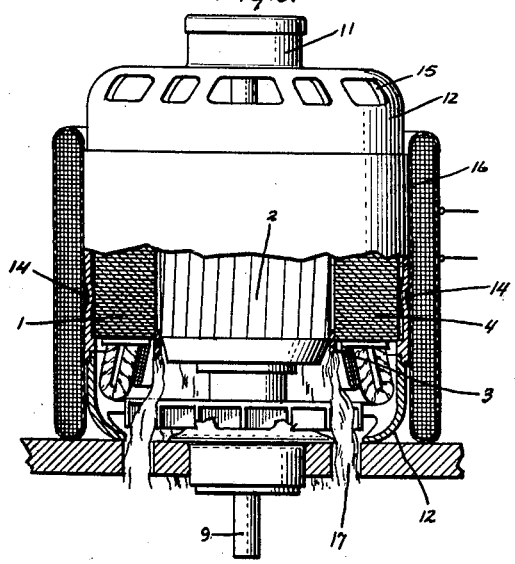
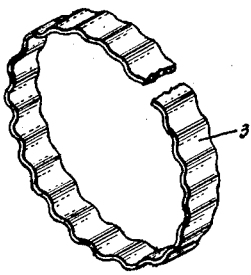
Inventor:
Lawrance W. Wightman,
by Robert G. Ivey
His Attorney.

April 6, 1965 L. W. WIGHTMAN 3,176,380
METHOD OF ASSEMBLING A DYNAMOELECTRIC MACHINE
Original Filed Aug. 26, 1958 2 Sheets-Sheet 2
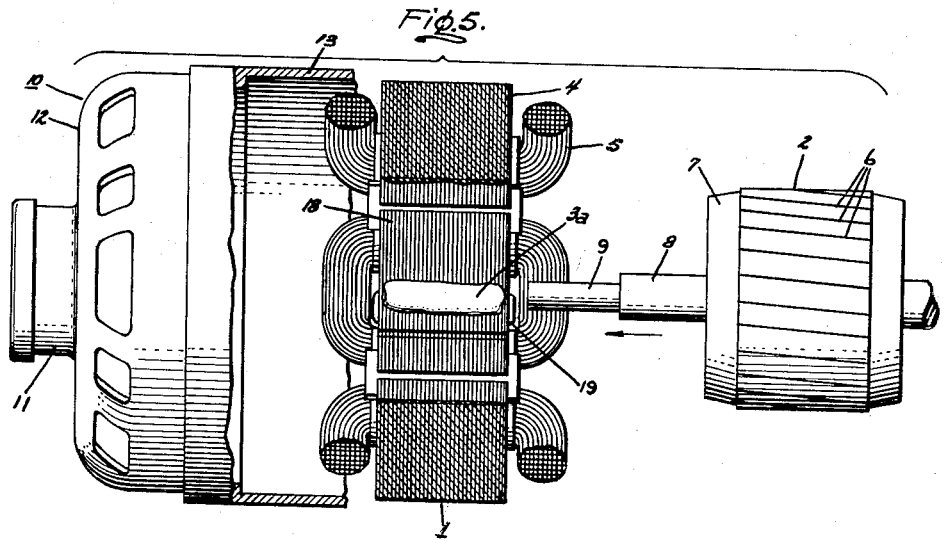
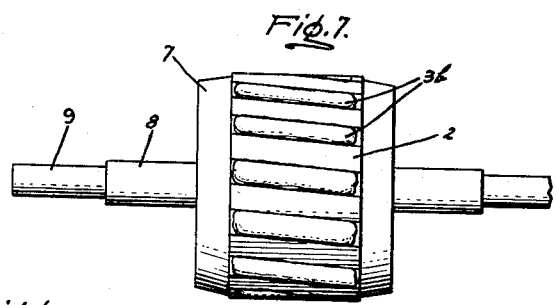
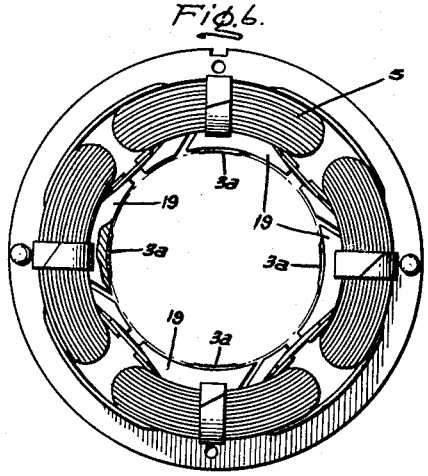
Inventor:
Lawrance W. Wightman,
by H. F. Manbeck, Jr.
His Attorney.

United States Patent Office 3,176,380
Patented Apr. 6, 1965

3,176,380
METHOD OF ASSEMBLING A DYNAMO-
ELECTRIC MACHINE
Lawrance W. Wightman, St. Louis, Mo., assignor to General Electric Company, a corporation of New York
Continuation of application Ser. No. 757,652, Aug. 26, 1958. This application Nov. 28, 1961, Ser. No. 174,329
5 Claims. (Cl. 29—155.5)

This invention relates to dynamoelectric machines, and more particularly to an improved method of assembling such machines. This application is a continuation of my co-pending application Serial No. 757,652, filed August 26, 1958, for the Method of Assembling a Dynamoelectric Machine (now abandoned), which in turn is a continuation-in-part of my original application Serial No. 543,769, filed October 31, 1955 (now abandoned in view of the continuation-in-part application Serial No. 757,652).

With a few specialized exceptions, dynamoelectric machines generally include concentrically arranged stationary and rotatable members, called respectively the stator and the rotor, with the rotor being separated from the stator by a predetermined radial air gap. Operation of such machines is achieved by the establishment of a flux field across the gap between the stator and rotor members, and the strength and effectiveness of this field is controlled to a great extent by the size of the air gap. It is therefore most important to have the two members concentrically arranged so that during rotation, the air gap will be substantially constant. In the past, considerable time and effort has generally been necessary to effect proper centering of the stationary and rotatable members. Usually, the machine was assembled with the members approximately in their final positions, and then the rotor was moved about until, by trial and error, its centered position was achieved. While a properly centered dynamoelectric machine can be achieved by such a process, it will be seen that the time factor must of necessity be considerable, thus entailing extra expense. It is accordingly most desirable to curtail the time involved by achieving centering of the members in a standard simple manner which will eliminate the trial and error approach previously frequently used.

It is, therefore, an object of this invention to provide an improved method of assembling dynamoelectric machines which will incorporate the desirable features set forth above.

Further objects and advantages of this invention will become apparent and the invention will be better understood by reference to the following description and the accompanying drawings, and the features of novelty which characterize this invention will be pointed out with particularity in the claims annexed to and forming a part of this specification.

In carrying out of the objects of my invention in one form thereof, I provide a method of assembling a dynamoelectric machine having a stator, a rotor, and a frame or housing assembly rigidly supporting the stator and rotatably supporting the rotor concentrically with the stator. The first step involves the assembly of the rotor and stator in their predetermined relationship, with shim means preferably formed of hardened thermoplastic or other solid, nonmetallic and fluidic material provided in the air gap between them to maintain them in concentricity. The stator, rotor, and the housing assembly are then assembled together, and heat is applied to the assembled dynamoelectric machine to fluidize the shim means and to cause it to be removed in fluid form from the air gap. In this manner, the air gap is automatically provided so that when the assembly is completed there can be no question of eccentricity between the rotor and stator members.

In the drawings, FIGURE 1 is a side view, partly broken away and partly in cross section, illustrating one embodiment of the stator, rotor, and shim members during the first step of the improved method of this invention;

FIGURE 2 is a similar view during the next step of this invention;

FIGURE 3 is a similar view during the final step of the improved method of this invention;

FIGURE 4 is a perspective view of the shim means shown in FIGS. 1–3 and used in the improved method of this invention;

FIGURE 5 is an exploded side elevational view, partially in section, of certain parts of a dynamoelectric machine during assembly, the view illustrating another embodiment of the shim means used in the improved method of this invention;

FIGURE 6 is an end view, partly broken away, of the stator shown in FIG. 5; and

FIGURE 7 illustrates another variation of the shim means used in the method of this invention.

Referring now to the figures of the drawings, a stator member 1 and a rotor member 2 of a dynamoelectric machine are assembled in concentric relationship, as shown in FIGURE 1, and in accordance with one embodiment of my invention are maintained in that relationship by preformed members 3 which are formed of an arcuate or substantially annular corrugated configuration and which, in effect, are used as shims at each end of the members 1 and 2. Stator member 1 may be of the typical variety, where a magnetic core 4 is provided with coils 5; the rotor member 2 that is shown is that of a standard induction type machine wherein a plurality of conductors 6 are short circuited together at each end by rings 7. Shim means 3 may be corrugated in order to achieve a spring effect, since such an arrangement facilitates the assembly of the rotor and stator with the shim means arranged therebetween. Of course, shim 3 could be formed of any ribbed configuration having a plurality of raised and depressed portions in order to provide the desirable spring effect. As shown in FIGS. 1–4, the shim means is substantially annular and may be of any thermoplastic material, such as, for instance, a suitable polyethylene or a suitable superpolyamide, having a melting point sufficiently low that it is liquefied at a temperature which will not harm any other part of the machine such as, for instance, coil 5.

Rotor member 2 is generally provided with a shaft 8 secured concentrically thereto and provided with portions 9 of decreased diameter which are adapted to be held within bearings, as will be set forth below.

With the stator 1 and rotor 2 maintained in concentric relationship by shims 3, the housing of the motor, generally indicated at 10, is assembled to the rotor and stator assembly. Each portion 9 of the shaft is rotatably supported in a bearing 11 provided in an end shield member 12, which in turn is secured to a tubular housing member 13 so as to form an enclosure for the rotor and stator. In the embodiment shown, member 13 is peripherally spaced from the outer surface of the stator core 4 and is then secured thereto by welding it down to the outer surface thereof, as shown at 14. It will be observed that the method of securing member 13 to stator core 1 permits the assembly to be effected without the exercise of undue forces on the stator 1 relative to the rotor 2, so that the shim member 3 will, in effect, determine the relative locations of the stator and rotor after assembly of these elements into the housing 10.

While the embodiment illustrated utilizes the welded construction shown at 14 to secure the housing member 13 to the stator core 4, it will be understood that the necessary feature is that means be provided to ensure that the relationship of the stator and rotor to the housing will be flexible during assembly since it is this relationship which is to be varied instead of the concentric relationship of the stator to the rotor. Thus, for instance, the well known construction wherein bearings are adjustably mounted in the end shields may be utilized to achieve this relationship instead of the welded construction as shown at 14. In addition, any other standard means of achieving securement of the rotor and stator to the housing assembly by relatively adjustable means may be used.

Once the assembly of the motor is complete, as shown in FIGURE 2, the motor is then arranged to be heated; that is, heat is applied, either directly or indirectly, to any of the surfaces juxtaposed to the shim means in order that the shim means may be melted out of the air gap. This may be effected in any desired manner, such as, for instance, that shown in FIGURE 3 utilizing an induction coil 16. The housing of the motor is preferably provided with openings such as openings 15 formed in end shields 12, and the motor is arranged so that when heat is applied by the selected means, in this instance coil 16, the shim 3 of thermoplastic material will melt and will flow out of the openings 15 as shown at 17. In this manner, the shim 3 is easily disposed of after the motor has been completely assembled without any need for exerting any kind of force on the motor or effecting any kind of disassembly thereof. Thus, the concentric relationship of the rotor 2 and the stator 1, achieved by means of shims 3, is maintained after the shims have been melted out.

In practicing my improved method of assembling dynamoelectric machine, it will occur to those skilled in the art that the shim means may take other forms. For example, in FIGURES 5 and 6 the shim means is illustrated in the form of four longitudinally extending, thermoplastic members 3a of predetermined thickness. Obviously, the relative thickness of the various shim members determine the uniformity of the air gap between the rotor and stator members. Thus, to provide concentricity between the rotor and stator members, the thickness of each shim member 3a should be substantially the same. Although I have shown a total of four shim members 3a in FIGURE 6 as comprising the shim means, this is by way of illustration only, and it will be obvious to those skilled in the art that the invention is not limited to a case where four shim members are used, but includes other variations of shim members which serve to center the rotor within the stator member. In certain instances, by increasing the number of shim members used, the degree of accuracy of alignment between the rotor and stator members is accordingly increased.

The method of assembly using shim means 3a is similar to that already disclosed. Initially, thermoplastic material in a plastic or semiplastic state is applied in predetermined amounts directly to the inner periphery 18 of the stator laminations in any suitable manner. That is, it is applied to the surface or surfaces of the stator defining the stator bore, and in the illustrated embodiment is applied to the faces of the respective stator poles. The thermoplastic material may be extruded onto the periphery at a plurality of points, as on each pole 20, and then the material, while in this plastic state, may be wiped by a suitable means to the desired thickness. After the shim means 3a has hardened to the desired degree; i.e., hardened sufficiently to hold the rotor stationary relative to the stator member, the rotor 2 is inserted into the stator 1. Thus, the hardened shim members then serve to position the rotor and stator members in a predetermined, concentric, spaced relationship, and the assembly of the dynamoelectric machine may then be completed in the manner heretofore described.

The final step of the assembly is, of course, to melt the shim means thereby freeing the rotor for rotation relative to the stator.

In FIGURE 7, the shim means is shown in another variation as being applied to the rotor 2 instead of the inner periphery 18 of the stator. The shim means comprises a plurality (approximately 12) of thermoplastic members 3b, skewed at an angle with respect to rotor shaft 8. Of course, it is obvious that the shim means, whether preformed or applied either to the rotor or stator, may take other forms than those disclosed; e.g., helical or spiral configurations, without departure from the true spirit and scope of the invention.

It will be seen from the foregoing that this invention provides a method of assembling a dynamoelectric machine wherein the stator and rotor members are positively arranged in concentric relationship and are maintained in that relationship throughout the assembly of the dynamoelectric machine, with the relationship assured even after complete assembly and after the shim means have been removed.

Accordingly, it is my intention to cover all changes and modifications of the examples of the invention herein chosen for purposes of disclosure, which do not constitute departures from the true spirit and scope of my invention as defined in the appended claims.

What I claim as new and desire to secure by Letters Patent of the United States is:

1. A method of assembling a dynamoelectric machine having a stator, a rotor, and a housing rigidly supporting said stator and rotatably supporting said rotor comprising the steps of assembling said rotor and said stator in their predetermined concentric relationship, inserting an annular, corrugated, meltable non-metallic shim member in the air gap between said stator and said rotor at each end thereof to maintain them in concentric relationship with said shim member having a melting point below the temperature at which temperature sensitive machine parts are deleteriously affected, assembling said stator and rotor in said housing, securing said stator and housing together while maintaining said corrugated meltable shim members in said air gap, and applying heat to the assembled dynamoelectric machine to liquefy said shim members and causing said liquefied shim members to be removed from said air gap to release said stator and said rotor relative to each other, said housing fixedly retaining said predetermined concentric relationship established by said corrugated shim members.

2. A method of assembling a dynamoelectric machine having a stator, a rotor, and frame means securing together said stator and rotatably supporting said rotor for relative rotation, comprising the steps of assembling said rotor and said stator in a predetermined spaced relationship to define an air gap therebetween with solid fluidic shim means of non-metallic material disposed in the air gap engaging the rotor and said stator with said shim means having a point of fluidity below the temperature at which temperature sensitive machine parts are deleteriously affected, assembling said rotor and said stator with said frame means while said fluidic shim means maintains said predetermined relationship between the rotor and stator, and applying heat to the shim means of the assembled dynamoelectric machine to fluidize said shim means and causing the fluidic material to be removed in fluid form from said air gap for releasing said rotor and said stator for relative rotation, said frame means retaining said predetermined relationship established by the solid fluidic material.

3. A method of assembling a dynamoelectric machine having a stator member, a rotor member, and a frame assembly supporting said members for relative rotation with an air gap provided therebetween comprising the steps: applying non-metallic fusible material in an unhardened state onto the surface of at least one of said members and forming the material into shim means of predetermined thickness on said surface, the fusible material having a point of fusion below the temperature sensitive machine parts are deleteriously affected; hardening said means to the degree necessary for maintaining said members temporarily stationary in a predetermined spaced relationship; arranging said rotor and stator members in a predetermined spaced relationship with said hardened shim means in said air gap to hold said members temporarily in said relation; securing said frame assembly and stator member together while said hardened fusible shim means maintains said predetermined relationship between the rotor and stator members, and causing the fusible material to be removed in fluid form from the air gap for releasing said stator and rotor members relative to each other, said frame assembly fixedly retaining said predetermined spaced relationship established by said hardened fusible shim means.

4. A method of assembling a dynamoelectric machine having a stator member formed with a surface defining a rotor receiving bore, a rotor member, and a housing assembly supporting said members for relative rotation and in a spaced concentric relationship to define a uniform air gap therebetween comprising the steps: applying non-metallic fusible material in an unhardened state onto the surface of at least one of said members at a number of angularly spaced apart positions, with said fusible material having a fusion point below the temperature at which the temperature sensitive machine parts are deleteriously affected and wiping said material to produce a plurality of elongated transversely arcuate shaped shims of substantially the same thickness adhering to said surface, with each shim being generally uniform in thickness throughout its length; hardening the shims to the degree necessary to maintain said members temporarily in the predetermined concentric relationship; assembling said rotor and stator members in said spaced concentric relationship with the hardened shims disposed in the air gap and in engagement with the peripheral surface of the other member; securing said housing assembly and stator member rigidly together with the housing assembly supporting said rotor member while said shims maintain said members in the predetermined concentric relationship; and applying sufficient heat to said shims to fluidize them and causing the shims to be removed from the air gap, the stator and rotor members being released for relative rotation and the predetermined concentric relationship established by the shims being fixedly retained by said housing assembly.

5. A method of assembling a dynamoelectric machine having a stator, a rotor, and frame means securing together said stator and rotatably supporting said rotor for relative rotation, comprising the steps of assembling said rotor and said stator in a predetermined spaced concentric relationship to define an air gap therebetween with shim means of hardened non-metallic thermoplastic material disposed in the air gap engaging said rotor and said stator, said shim means having a point of liquifaction below the temperature at which the temperature sensitive machine parts are deleteriously affected, assembling said rotor and said stator with said frame means, securing said stator and frame means together while said hardened shim means maintains said predetermined concentric relationship between the rotor and stator, and applying heat to the shim means of the assembled dynamoelectric machine to liquefy said shim means and causing said liquid shim means to flow from said air gap for releasing said stator and said rotor relative to each other, said frame means retaining the predetermined relationship established by said hardened shim means.

References Cited by the Examiner

UNITED STATES PATENTS

| | | | |
|---|---|---|---|
| 1,527,162 | 2/25 | Alvord | 29—155.59 X |
| 2,423,750 | 7/47 | Benson. | |
| 2,476,937 | 7/49 | White | 117—6 |
| 2,608,529 | 8/52 | Varian | 29—423 X |
| 3,002,261 | 10/61 | Avila et al. | 29—155.5 |

WHITMORE A. WILTZ, *Primary Examiner.*

JOHN F. CAMPBELL, *Examiner.*